United States Patent [19]

Geist

[11] Patent Number: 4,996,834

[45] Date of Patent: Mar. 5, 1991

[54] CLEANING PADDLE

[76] Inventor: George A. Geist, 2455 South Shore Blvd., White Bear Lake, Minn. 55110

[21] Appl. No.: 289,242

[22] Filed: Dec. 23, 1988

[51] Int. Cl.[5] ............................................. A01D 7/00
[52] U.S. Cl. ................................ 56/400.17; 294/53.5
[58] Field of Search ............ 56/400.17, 400.15, 400.01

[56] References Cited

U.S. PATENT DOCUMENTS

| | | | |
|---|---|---|---|
| 611,312 | 9/1898 | Beldin | 294/51 |
| 825,461 | 7/1906 | Hasseler | 294/51 |
| 1,935,510 | 11/1933 | Lofton | 294/51 |
| 2,536,607 | 1/1951 | Jenkins | 56/400.17 |
| 2,884,278 | 4/1959 | Waara | 294/51 |
| 3,691,743 | 9/1972 | Browning | 56/400.05 |
| 4,264,095 | 4/1981 | Lemasters | 294/53.5 |
| 4,565,398 | 1/1986 | Poulin | 294/52 |
| 4,791,780 | 12/1988 | Phillips | 56/400.17 |

FOREIGN PATENT DOCUMENTS

| | | | |
|---|---|---|---|
| 536036 | 4/1955 | Belgium | 56/400.01 |
| 696850 | 1/1931 | France | 56/400.17 |
| 255015 | 6/1948 | Switzerland | 56/400.01 |

*Primary Examiner*—Ramon S. Britts
*Assistant Examiner*—Gay Ann Spahn
*Attorney, Agent, or Firm*—Jacobson & Johnson

[57] ABSTRACT

A paddling tool for moving material along the ground having an elongated handle with a freely pivoting blade on one end that pivots to engage the ground as the user pulls material along the ground by pulling the paddling tool through a paddling stroke alongside the user's body.

9 Claims, 2 Drawing Sheets

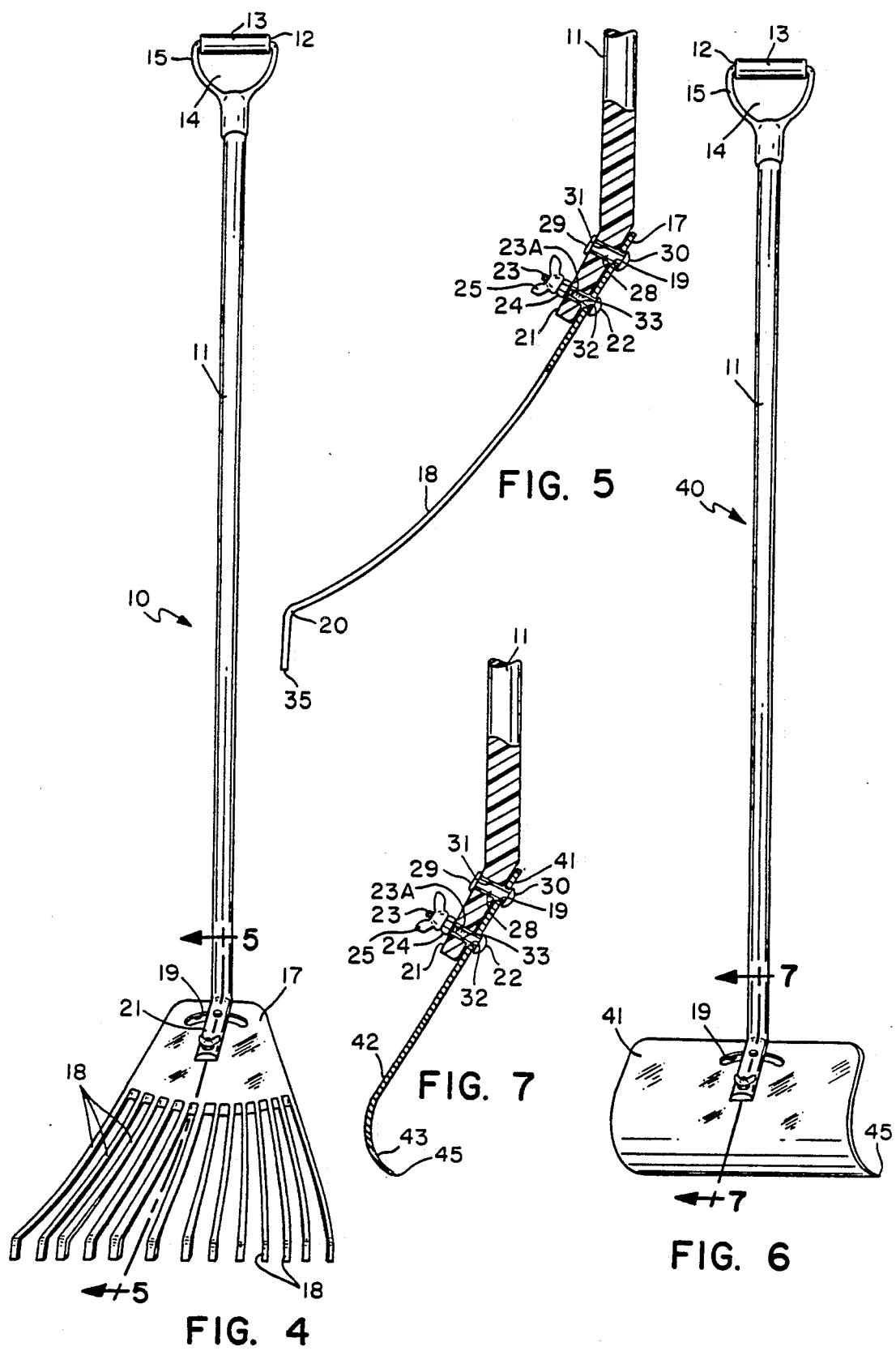

CLEANING PADDLE

FIELD OF THE INVENTION

This invention relates generally to clean up tools and, more specifically, to a clean up paddle that enables a user to remove snow or leaves in paddling action.

BACKGROUND OF THE INVENTION

One of the perpetual and tedious chores of a homeowner in the northern climates is to rake leaves and to remove snow from the sidewalks and driveways. Snow removal often requires one to shovel the snow off the sidewalk by lifting and throwing the snow off the sidewalk. Unfortunately, the human body sometimes balks at the strain of shoveling snow in the cold weather, resulting in heart failure that may lead to death. The present invention is directed to an improved rake and shovel tool that enables the user to remove leaves or snow in a paddling action that considerably reduces the strain on the human body.

DESCRIPTION OF THE PRIOR ART

The Lemasters U.S. Pat. No. 4,264,095 shows an adjustable snow shovel that one can pull snow along the sidewalk. A closed hand grip located on the handle permits the user to hold the blade down as one pulls the snow along the sidewalk. Lemasters includes clamp-type fasteners to secure both the handle and the blade in an adjusted position. In the Lemasters device the user pulls the snow along the sidewalk by pulling longitudinally along the handle and the hand grip attached midway on the handle. When the user gets the snow to the end of the sidewalk, the user can swing the snow off the sidewalk.

The Poulin U.S. Pat. No. 4,565,398 shows a multipurpose hand tool that one can connect either a hoe-like blade or a fork-like member to a bifurcated coupling element.

The Browing U.S. Pat. No. 3,691,743 shows a scraping blade that can be mounted on the times of a hand rake to permit the user to convert the rake into a scraping tool.

The Beldin U.S. Pat. No. 611,312 shows a tool that has a shovel blade that can be flipped over the tines of a fork to convert the fork to a shovel or vice versa.

The Hasseler U.S. Pat. No. 825,461 shows a combination implement that also has a shovel blade that can be flipped over the tines of the fork to convert the fork into a shovel or vice versa.

The Lofton U.S. Pat. No. 1,935,510 shows a fork attachment for a shovel to permit the user to convert the shovel to a fork-like device for shoveling light material such as corncobs, silage or stable manure.

The Waara U.S. Pat. No. 2,884,278 shows a garden and lawn tool that has a tilting tool that can be tilted to form either a rake or a gardening tool.

BRIEF DESCRIPTION OF THE DRAWINGS

FIG. 4 shows a front view of my cleaning tool as a leaf paddle;

FIG. 5 shows a partial sectional view of the leaf paddle of FIG. 4;

FIG. 6 shows a front view of my cleaning tool as a snow paddle;

FIG. 7 shows a partial sectional view of my snow paddle of FIG. 6.

BRIEF SUMMARY OF THE INVENTION

Briefly, the present invention comprises a cleaning tool that has a handle with a pivoting blade that pivots to maintain its leading edge in contact with the ground as the user pulls the cleaning tool in a paddling motion so that the user can pull the leaves or snow along the ground in a paddling action rather than a pulling or lifting-and-throwing action.

DESCRIPTION OF THE PREFERRED EMBODIMENT

Figure 1:
FIG. 1 shows a user removing leaves with my cleaning paddle set up as a leaf paddle.
Figure 2:
FIG. 2 shows a user removing snow with my cleaning paddle set up as a snow paddle.

Referring to FIG. 1 reference numeral 9 identifies a user raking leaves with my leaf paddle 10 and FIG. 2 shows a user 9 moving snow with my snow paddle 40. Leaf paddle 10 is shown in greater detail in FIG. 4 and FIG. 5 and snow paddle 40 is shown in greater detail in FIG. 6 and FIG. 7.

In order to understand my invention and how it is used, reference should be made of FIGS. 1, 4 and 5. Leaf paddle 10 comprises an elongated straight handle 11 that can be made of a lightweight material such as wood or aluminum. Located on one end of leaf paddle 10 is a hand grip 12 having a cross bar 13 for the user to grasp in one hand. A yoke 15 securely holds cross bar 13 to the end of handle 11 so that a user can insert the fingers of the hand into opening 14 to grasp cross bar 13 which is located perpendicular to handle 11. The use of the cross bar on handle 11 permits the user to control the direction of leaf paddle 10 by applying a torquing action to handle 11 in order to maintain handle 11 in the proper orientation.

Located on the opposite end of handle 11 is an angled shank 21 that connects to a pivoting leaf blade 17. Pin 28 includes a head 30 to hold blade 17 on handle 11. Shank 21 has a first circular hole 31 extending therethrough with a pin 28 extending through hole 31 and an arcuate slot 19 located in the top portion of leaf blade 17. Shank 21 has a second circular hole 33 extending therethrough with a bolt 23 having a head 22 on one end and a threaded section 23A on the opposite end. Located on threaded section 23A is a first nut 24 and a second wing nut 25. The use of two nuts adjacent and in engagement with one another permits the user to secure the nuts to each other. By securing the nuts to each other the user can adjust the amount of frictional forces that holds angled shank 21 against blade 17. That is, the user can provide for a freely pivoting action between handle 11 and blade 17 by merely tightening nuts 24 and 25 against each other rather than using the nuts to tightly secure angled shank 29 to blade 17. The use of a connection that provides a freely pivotable connection between the handle and the blade permits the blade to pivot and rotate to maintain the leading edge 35 of the blade in contact with the ground as the user pulls the leaf paddle through a paddling stroke.

Figure 3:
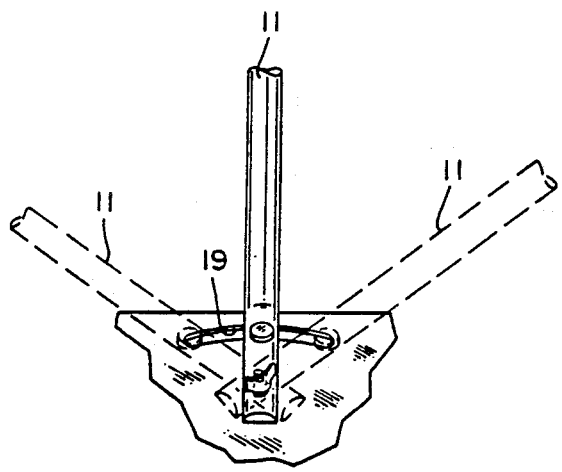
FIG. 3 shows the pivotal connection of the handle of my cleaning paddle to the blade end of the paddle.

The pivotal action of handle 11 and leaf blade 17 is illustrated in FIG. 3 which shows in phantom handle 11 at the ten o'clock and the two o'clock positions. That is in operation of my leaf paddle, blade 17 is permitted to pivot with respect to handle 11 so that all the tine ends 20 can remain in contact with the ground as the user paddles the leaves across the yard.

Leaf blade 17 comprises a top section having arcuate slot 19 and a lower section havng a plurality of tines 18 extending in a fan-like arrangement from the top section. Arcuate slot 19 permits handle 11 to pivot about bolt 23 and also limits the amount of pivoting of handle 11 through the following action of pin 28. That is, as handle 11 pivots to the side of leaf blade 17 the pin 28 engages the end of slot 19 thereby preventing further pivoting action of handle 11 with respect to blade 17. By limiting the amount of pivoting action of slightly more than is necessary for the blade to be pulled through a paddling stroke insures that the blade will at all times remain in an orientation fairly close to its operating position. In addition, the pivot opening 32 in blade 17 is located near the top portion of the blade so that the heavier portion of the blade is located below the pivot opening 32. During the backstroke the combination of the heavier portion of the blade 17 below pivot opening 32 and the blade mounted in a freely pivotable condition permits the weight of the blade to rotate blade 17 into the position for starting of the paddling stroke. Blade 17 have tines 18 which have a slight backward curve as shown in FIG. 5 with tine ends 20 angled forward to provide a cupping action around the leaves as the user paddles the leaves along the yard.

FIGS. 2, 6 and 7 show another embodiment of my cleaning tool set up as a snow paddle rather than as a leaf paddle. Snow paddle 40 is identical to my leaf paddle 10 except that snow paddle 40 has a snow blade 41 pivotally attached to the handle. For ease in understanding, the identical parts in snow paddle 40 and leaf paddle 10 have been given identical identification numbers.

FIG. 6 and FIG. 7 show snow blade 41 in greater detail with snow blade having a top section 42 with a general rectangular shape and a lower section 43 with a backward curved end that terminates in a leading edge 45 that enables the user to paddle the snow along the sidewalk.

In operation of my invention as either a leaf paddle or a snow paddle, the blade is permitted to pivot as the paddle is pulled through its stroke. In order to more fully understand the operation of my invention, reference should be made of FIG. 1 which shows a user holding leaf paddle 10 in a paddling position with leaf blade in front and to the side of the user with the end of tines 18 in contact with the ground. When removing leaves with a right side stroke, the user positions the body so that the right shoulder is adjacent to the leaves to be moved. The user then extends leaf blade 17 out and forward of the body in a manner identical to paddling a canoe. Once the end of the blade engages the ground; the user then pulls blade 17 toward and past the body in a paddling action. Even though the vertical orientation of handle 11 changes during the paddling stroke, the freely pivioting connection between blade 17 and handle 11 permits the user to maintain the end of tines 18 in contact with the ground during the pulling portion of the paddling stroke. Once the user pulls the blade past the body, the user lifts the blade off the ground and swings the leaf blade 17 into a forward position in front and to the side of the user and sets the leading edge of the leaf blade in contact with the ground to permit the user to repeat the paddling stroke. Once a paddling stroke is completed, the user repeats the stroke to move the leaves along the ground. If the muscles in the user's arms should get tired, the user can switch the paddle to the opposite side of the body, much like a canoeist does to relieve tired muscles.

FIGS. 4 and 6 illustrate that my cleaning paddles have rounded top corners on both sides of the top of the blades. The rounded corners prevent the top of the blades from snapping a user's trousers during the paddle stroke on either side of the body.

I claim:

1. A paddling tool for moving material in a paddling action comprising:
    an elongated handle having a first end and a second end, said handle having a handgrip on said first end to permit a user to grasp and hold said hand grip in one hand;
    a blade for moving material, said blade having a leading edge for pulling along a surface; and
    means for pivotally and freely connecting said blade to said handle so that when the user pulls the paddling tool in a paddling action alongside the user's body, said blade pivots laterally to permit the leading edge of said blade to follow along the surface being cleaned as the user pulls said paddling tool through a paddling stroke.

2. The paddling tool of claim 1 wherein said blade comprises a leaf blade for moving leaves along the ground.

3. The paddling tool of claim 1 wherein said blade comprises a snow blade for moving snow along the ground.

4. The paddling tool of claim 1 wherein said means for pivotally connecting said blade to said handle includes a double nutted bolt that can be secured at the proper tension to permit the free pivoting of said blade with respect to said handle.

5. The paddling tool of claim 4 wherein said means pivotally connecting said blade to said handle includes an arcuate slot in said blade to limit the pivoting action of said blade.

6. The paddling tool of claim 5 wherein said second end of said handle has an angled shank for engagement with said blade.

7. The paddling tool of claim 5 wherein said blade has a curved end to cup the material being paddled.

8. The paddling tool of claim 7 wherein said leading edge is straight for engaging a flat surface.

9. A paddling tool for moving material in a paddling action along a ground surface while the user stands erect comprising:
    an elongated handle having a handgrip with a cross bar for a user to grasp in one hand;
    a blade pivotally and freely connected to said handle, said blade having a leading edge for following along a ground surface, said blade operable for pivoting with respect to said handle so that said leading edge remains in contact with the ground surface as the paddling tool is pulled through a paddling stroke to thereby permit the user to move the material in a paddling action along the ground surface.

* * * * *